Dec. 25, 1934.　　A. McL. NICOLSON　　1,985,684
PANORAMIC TELEVISION SYSTEM
Filed Dec. 30, 1930　　2 Sheets-Sheet 2
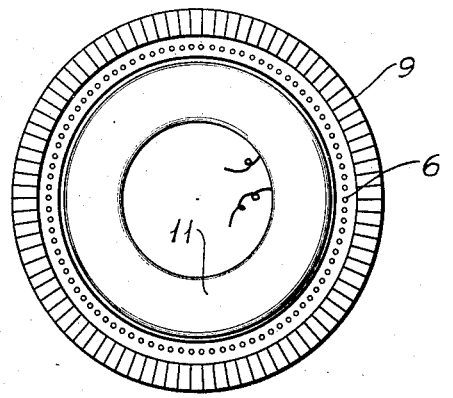
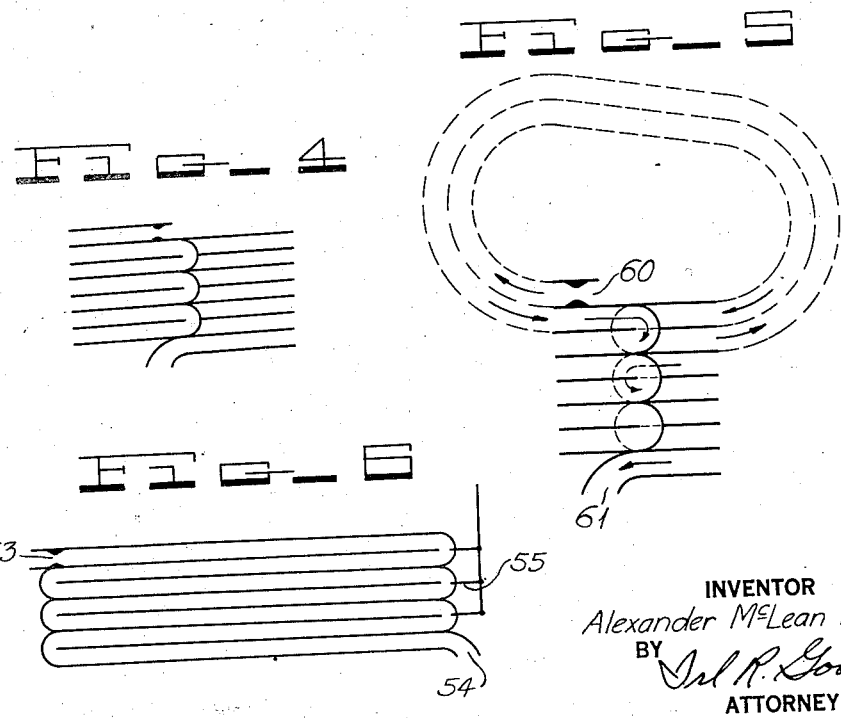
INVENTOR
Alexander McLean Nicolson.
BY
ATTORNEY Patented Dec. 25, 1934

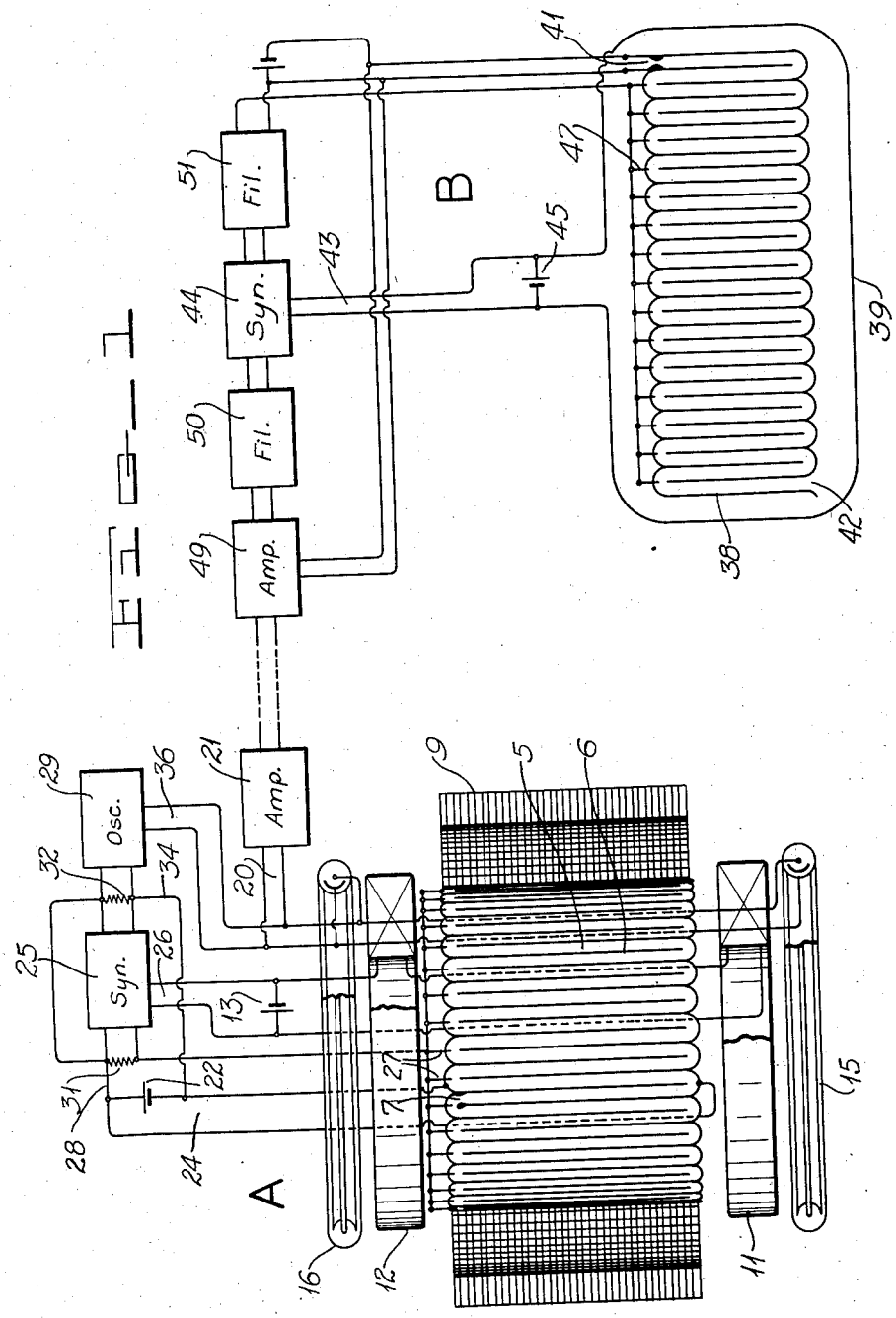

1,985,684

UNITED STATES PATENT OFFICE 1,985,684

PANORAMIC TELEVISION SYSTEM

Alexander McLean Nicolson, New York, N. Y., assignor to Communication Patents, Inc., New York, N. Y., a corporation of Delaware Application December 30, 1930, Serial No. 505,529

17 Claims. (Cl. 178—6)

This invention relates to the transmission of electrical currents characterized by the light and shade variations of scenes or objects therein, and particularly to apparatus for scanning all points on a horizon and the complete reproduction thereof upon a screen visible to a single observer.

An object of the invention is to scan an endless scene.

Another object of the invention is to scan an endless scene and reproduce said scene so that all parts thereof are simultaneously visible to an observer.

A further object of the invention is to obtain characterizations of a complete horizon in unit areas and reproduce said areas upon a screen representing a development of the horizon.

The present television systems are limited to a definite angle of projection or scanning similar to apparatus used for still and motion picture photography, although the latter have been adapted to obtain panoramic pictures. However, a still panoramic picture does not provide the character of picture desired, while the motion picture does not provide an instantaneous view of the complete horizon. With either system, an instantaneous reproduction of moving objects and their movements within an entire room, for example, is not obtainable.

The present invention contemplates the reproduction of a complete scene on all points of the compass in the same manner as though only one point was being reproduced. For instance, if a person standing in a definite position were to turn through an angle of 360°, the view obtained by such person would be presented on a plane screen effectively simultaneously. That is, the scene is separated at a particular point and developed in a vertical plane, causing the scene to be visible at the same instant without motion on the part of the observer.

Briefly, the apparatus to accomplish the above objects consists of a cylindrical scanning screen which scans successive unit areas in the proper order for synthetic reproduction on a plane receiving screen. A camera having a plurality of pinholes or lenses is employed to create a concentrated and defined beam of light which follows the movements of the arc as it is propagated over the screen. An electrical discharge or arc is the source of scanning light, the movement thereof over a rail electrode system of cylindrical configuration being obtained by a magnetic field. A plane system of electrode rails with an arc of the discontinuous type provides the receiving screen. The fundamental principles for operating an arc for scanning and receiving and the manner of synchronization is well described in my Patent No. 1,863,278, issued June 14, 1932.

The details of the present invention will be more fully understood by reference to the following description in conjunction with the accompanying drawings, in which:

Figure 1 represents scanning and receiving apparatus with its associate circuits in accordance with the invention;

Figure 2 is an elevation of the camera;

Fig. 3 is a cross-sectional view of the scanning unit; and

Figs. 4, 5 and 6 are views of a second modification of scanning and receiving screens.

Referring particularly to the system in Fig. 1, a cylindrical arc screen 5 is shown having a vertical rail system 6 with a foreshortened starting gap 7. This arc screen is shown in the portion of the drawings indicated by A, and represents the transmitting end of the system, while B represents the receiving portion or distant station. Surrounding the transmitter screen is a camera system 9 comprising a honeycomb mesh through any one section of which the arc may project light at any one instant. That is, there is sufficient depth of this honeycomb structure to prevent light from the arc being projected through more than one section at any instant. Figures 2 and 3 show this portion of the camera more clearly.

Above and below the arc screen and mounted coaxially therewith are field coils 11 and 12. These coils are wound and so connected with a source of energy 13 that like poles are adjacent one another. In this manner a field of fringing flux forms perpendicularly to the position of the arc between the rails and produces on the arc a force for propagating it over the electrodes of the screen. For detailed information as to how the arc is propagated over a rail system of this type, reference is made to applicant's copending application mentioned above. Also located concentrically with the screen and field coils are two photocell systems 15 and 16. These cells may be made in the form of an annulus or may be a plurality of straight cells located in a plurality of positions either above or below the screen. These cells are connected through conductors 20, to an amplifier system 21. The output of the amplifier may be transmitted over a radio transmission system or over wires to a receiving screen.

The arc is supplied with potential from a D. C. source 22 which is connected to opposite rail electrodes over conductors 24. It is to be understood of course that the sources 13 and 22 may be A. C., the system operating as disclosed in my Patent No. 1,901,116, issued March 14, 1933. A synchronizer system operating on the same principle as that disclosed in the first above mentioned copending application is employed in the present invention. The synchronizer is shown at 25, one input of which is connected to probes 27 inserted in the path of the arc but disconnected from the electrodes. The remainder of this input circuit is found through one of the conductors 24 and the conductor 28. The other input of the synchronizer is from an oscillator 29 which furnishes starting impulses and intermediate synchronizing impulses of lower amplitude. Amplitude adjusting resistances 31 and 32 are provided to adjust the balance of the system. The oscillating impulses are fed to the arc screen over conductors 28 and 34. The oscillator output is also impressed upon the amplifier 21 over conductors 36 and transmitted to the receiving system, while the synchronizer output circuit is over conductors 26 to the field coils 11 and 12.

At the receiving station B an arc screen 38 similar to that shown at the transmitter A but formed in a vertical plane is employed, which has a field winding 39 of either the spherical type or in the form of a cylindrical coil. Since the screen 38 is all in one plane, a single coil system will suffice to produce flux perpendicularly to the arc at any time. In this system a foreshortened gap 41 initiates the arc which is blown out at a horn gap 42. Immediately upon its disappearance at 42, however, it is created at 41 to obtain continuity while permitting development of the arc screen 5 into a plane screen. A synchronizer 44 is employed at the receiving station which operates identically as synchronizer 25 at the transmitter. The output of this synchronizer feeds increased direct current to the field winding 39 over conductors 43 adding to or subtracting from the field energy supplied from the source 45. One of the inputs to the synchronizer 44 is from the probes 47, and the other from the receiving amplifier 49. Filters 50 and 51 are employed to separate the initiating and synchronizing impulses from the illuminating components so that only the former are impressed upon the inputs of the synchronizer. Of course, all impulses are impressed upon the screen.

To obtain a better idea of the construction of the cylindrical scanner, reference is made to Figs. 2 and 3 in which the honeycomb camera construction is shown more in detail. It is to be understood that a plurality of small circular lenses will provide a similar result, but I prefer to use the honeycomb structure. In Fig. 3 the field coil 11 is shown mounted within the periphery of the screen 6, but a portion of the coil may extend beyond the circumference of the screen. The coil may also have a core extending partially within the screen. The honeycomb sections are shown to be slightly wedge shaped to conform with the varying diameters of the thickness of the structure.

Referring to Fig. 4 an annular screen is shown in which the electrode rails are circumferentially disposed. This screen scans by traversing line sections back and forth, and has an overlapping terminal as shown in detail in Fig. 5. The dotted lines connect the terminals to show how the arc travels from the foreshortened gap 60 to the blow-out terminal 61. The corresponding receiving screen shown in Fig. 6 has a foreshortened gap 53 and a blow-out terminal 54. Synchronization between the two screens may be obtained with the use of probes 55 at the points of the screen where the arc reverses itself. These may be connected into the transmission system in exactly the same manner as shown in Fig. 1, and the entire screen may be used in the system of Fig. 1 with the circuit shown therein. The screens in Figs. 5 and 6 may also be made continuous, while the screen in Fig. 1 may be made discontinuous in the form shown in Fig. 5, without changing the system or the receiving screen. A return path may be used at both as long as synchronization is maintained between the two screens over comparable paths.

The operation of the system as shown in Fig. 1 is as follows: The field coils are energized producing fringing flux the lines of which are perpendicular to a line drawn between any of the arc rails. Polarizing of the rails 6 by the source 22 maintains the proper arc after it is once initiated. Energization of the oscillator 29 produces an initiating peak voltage sufficient to initiate the arc at the gap 7. The force produced on the arc by the field flux propagates it over the electrode rails. Each time the arc passes one of the probes 27 it produces an impulse in the synchronizer 25. A balancing impulse is also impressed on the synchronizer 25 from the oscillator 29, causing no change in the field strength if the arc is traveling at its proper velocity. Should a change occur, however, in this velocity, a voltage is impressed on the field coils over the conductors 26 which will strengthen or weaken the field in accordance with the lag or lead of the arc. As the arc is propagated around the cylindrical screen it is projected through the honeycomb structure 19 on unit areas of a complete scene taking in the entire horizon. The varying values of returned reflected light in accordance with the light and dark variations of the scene are received upon the photocells 15 and 16 or one or more of said cells, the voltage generated therein being impressed upon the amplifier 21 for transmission to a receiving system.

The received currents are amplified at the receiving end to the proper operating strength and impressed upon the receiving arc screen 38 varying the arc produced thereon by the initiating impulse in accordance with the light and shade intensities of the scanned scene. The arc is properly framed and started at its gap 41 by the initiating impulse which is impressed on the transmission line over conductors 36 together with the synchronizing or intermediate impulses. Since the initiating impulse starts the transmitting arc at the gap 7, as well as the receiving arc at the gap 41, the pictures are perfectly framed at all times. The synchronizing and initiating impulses are also fed into the synchronizer 44 through the filter 50 in order to counteract the voltage produced at the probes 47. Any variation in time reception at the synchronizer, strengthens or weakens the field in the same manner as at the transmitter.

With the above system it is possible to scan through any angle desired and obtain for transmission the complete scene at any point and bring such scene into instantaneous view by reproduction. It eliminates the necessity of obtaining separate views and then placing them together to obtain a panorama and prevents the elimination of a portion of a view while the other portion is being shown such as is common in motion picture practice. With the present invention the entire horizon may be observed at any instant for the purpose of charting or investigating any developments along all points of the horizon. In other words, a panoramic television system is disclosed with its obvious advantages.

It is to be understood that the circular arc scanning screen with its developed receiver may be adapted to other uses beside the embodiment disclosed herein, and that the proper scope of the invention is defined by the appended claims.

What is claimed is:

1. In a television system, means for scanning a stationary field of view through an angle of 360°, said means comprising means for producing an electrodynamic light source, means for transforming light variations of unit sections of said area into electrical currents corresponding thereto, a receiving screen, and means for reproducing said scanned area on said receiving screen.

2. A television system in accordance with claim 1, in which said receiving screen is entirely visible to an observer at any instant.

3. In a television system, a scanning screen, said scanning screen formed of electrode rails in a cylindrical pattern, an arc on said rails, means for propagating said arc over said rails, and means for transformng light and shade intensities of the area surrounding said screen into electrical currents corresponding thereto.

4. In a television system, an electrodynamic arc in a local magnetic field, said arc moving to form a light path, means for causing said arc by its motion to progressively illuminate the areas surrounding the path of said arc in unit sections, and means for transforming the various densities of light and shade into corresponding electrical current variations.

5. In a television system, a transmitting scanning screen having an electrodynamic arc as a source of light traveling thereover, said screen being in cylindrical form for projecting light to all points of the horizon, a receiving screen for projecting light to one point of the horizon, and means for synchronizing corresponding unit sections of said transmitting screen with said receiving screen.

6. In a television system, a transmitting screen comprising an electromagnetic arc in a local magnetic field, means for propagating said arc at a uniform rate over said screen, said screen having a curved surface, a receiving screen having a planar surface with unit sections thereof corresponding to said curved transmitting screen, means for transmitting impulses from the transmitting screen to said receiving screen, and means for producing synchronism between the arcs of said screens.

7. In a television system, a curved screen having electrode rails, means for producing an arc between said electrode rails, a receiving screen positioned in one plane having electrode rails, means for producing an arc on the rails of said receiving screen, said means corresponding with the means for producing an arc in said first screen, means at both of said screens for propagating said arcs, respectively, and means at both of said screens for maintaining both of said arcs in corresponding unit sections.

8. The method of obtaining the development of a three dimensional view through an angle greater than 180° comprising progressively scanning said entire view through an angle greater than 180° wholly within the time of the persistence of vision, generating current impulses characterized by the light and shade densities of said view, transmitting said impulses, and reproducing said view synchronously with the scanning thereof.

9. The method of scanning the complete horizon of a three dimensional view comprising progressively scanning said view through substantially 360° wholly within the time of the persistence of vision, transmitting the current variations characterized by the light and shade densities of said view, and reproducing said light and shade densities in a single plane synchronously with the scanning thereof.

10. In a television system, an electrodynamic arc scanning screen for projecting light rays through an angle greater than 180° progressively in unit sections, means for transforming the various light and shade densities in said area into corresponding electrical variations, and means for reproducing said electrical variations upon a second electrodynamic arc screen located in one plane.

11. In a panoramic television system, a traveling light source, means for projecting light from said source over a three dimensional view through an angle greater than 180° wholly within the time of the persistence of vision, means for translating the reflected light from objects scanned into electrical currents, mens for transmitting said electrical currents, a second traveling light source projecting light in unit area sections through an angle less than 180°, and means for maintaining both of said light sources in corresponding unit sections, both of said projecting light means completing their scanning cycles wholly within the time of the persistence of vision.

12. In a system for the transmission of visible images, a light source, means for projecting light from said source over a three dimensional field of view, said field of view lying within an angle greater than 180°, means for moving said light source in a path to scan said field of view in unit sections, means for translating light from said field of view into electrical currents, means for transmitting said currents, a second light source forming corresponding unit areas to said first light source, means for impressing on the said second light source currents corresponding to the light and shade intensities of objects scanned by said first light source, and means for maintaining each of said light sources in synchronism, both of said light sources completing their scanning cycles wholly within the time of the persistence of vision.

13. A method of scanning in unit sections an object in three dimensions comprising progressively rotating a scanning beam of light around said object wholly within the time of the persistence of vision, translating reflected light from said object into electric currents corresponding to the light transmitting said currents and shade intensities of the object, and reproducing from said received currents said light and shade densities in an image lying in one plane wholly within the time of the persistence of vision.

14. In a television system, a transmitting screen comprising an electrodynamic arc in a local magnetic field, means for propagating said arc at a uniform rate over said screen, a honeycomb type of partition immediately adjacent said screen through which light from said screen is projected in unit areas as said arc progresses over said screen, means for transforming the light and shade intensities of an object into corresponding electrical currents, and means for transmitting said currents.

15. In a television system, a curved electrode system having a plurality of electrode rails, means for producing a moving light source between said electrode rails, means for propagating said light source therealong in a continuous and uniform manner, a partition adjacent said screen having appreciable thickness and having a plurality of perforations through which light is projected from said source in unit areas over an object, means for translating the light and shade intensities of said object into corresponding electrical currents, and means for transmitting said currents.

16. In a system for the reproduction of a three dimensional field of view as a two dimensional view, means for projecting a unit light ray over said view through an angle greater than 180° wholly within the time of persistence of vision, means for generating currents characterized by the light and shade densities of said view, means for transmitting said currents, and means in a single plane for translating said currents into light impulses for reproducing said three dimensional view.

17. In a television system, scanning means for projecting a unit light ray through an angle of substantially 360° wholly within the time of the persistence of vision, said means comprising means for producing a moving light source, and means for detecting light and shade intensities of said scanned area.

ALEXANDER McLEAN NICOLSON.